(12) United States Patent
Yamada

(10) Patent No.: US 7,310,105 B2
(45) Date of Patent: Dec. 18, 2007

(54) IMAGE SIGNAL PROCESSING DEVICE AND IMAGE SIGNAL PROCESSING METHOD

(75) Inventor: Kazuhiro Yamada, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 331 days.

(21) Appl. No.: 10/542,025

(22) PCT Filed: Dec. 22, 2004

(86) PCT No.: PCT/JP2004/019696

§ 371 (c)(1),
(2), (4) Date: Jul. 11, 2005

(87) PCT Pub. No.: WO2005/064585

PCT Pub. Date: Jul. 14, 2005

(65) Prior Publication Data

US 2006/0291737 A1 Dec. 28, 2006

(30) Foreign Application Priority Data

Dec. 26, 2003 (JP) .............................. 2003-433153

(51) Int. Cl.
*G09G 5/10* (2006.01)
*G09G 3/28* (2006.01)
*G09G 5/02* (2006.01)

(52) U.S. Cl. .................. 345/690; 345/63; 345/694

(58) Field of Classification Search ........... 345/690, 345/694, 63
See application file for complete search history.

(56) References Cited

U.S. PATENT DOCUMENTS

| 5,229,762 | A | * | 7/1993 | Itoh et al. ............ 345/600 |
| 5,400,044 | A | * | 3/1995 | Thomas ............... 345/690 |
| 5,596,349 | A | * | 1/1997 | Kobayashi et al. ..... 345/690 |
| 6,747,669 | B1 | * | 6/2004 | Yamaguchi et al. .... 345/690 |
| 7,154,457 | B2 | * | 12/2006 | Sagano et al. ......... 345/78 |
| 7,180,480 | B2 | * | 2/2007 | Lee et al. ............. 345/60 |
| 2001/0045923 | A1 | * | 11/2001 | Otobe et al. .......... 345/63 |

(Continued)

FOREIGN PATENT DOCUMENTS

| EP | 0 844 783 | 5/1998 |
| JP | 6-268852 | 9/1994 |
| JP | 10-155086 | 6/1998 |
| JP | 11-146202 | 5/1999 |
| JP | 11-312235 | 11/1999 |

(Continued)

*Primary Examiner*—Richard Hjerpe
*Assistant Examiner*—Crystal Murdoch
(74) *Attorney, Agent, or Firm*—Wenderoth, Lind & Ponack, L.L.P.

(57) ABSTRACT

A first adding circuit sums an input image signal of a target pixel and a value that is derived by multiplying respective display errors of three pixels, which are before the target pixel by one line, by weighting factors. A gradation candidate converter converts the gradation of the summed image signal to a plurality of available gradation candidates that are convertible when an error of the immediate left pixel is added. A delaying circuit delays the summed image signal. A second adding circuit sums the delayed image signal and a value that is derived by multiplying the error generated in the immediate left pixel by a weighting factor. A gradation selector selects a gradation closest to the gradation of the image signal to which the error is added from a plurality of gradation candidates, and outputs it as an image signal of the target pixel. A differencing circuit determines a display error of the target pixel.

4 Claims, 7 Drawing Sheets

U.S. PATENT DOCUMENTS

| | | | |
|---|---|---|---|
| 2003/0011545 A1* | 1/2003 | Sagano et al. | 345/76 |
| 2003/0151773 A1* | 8/2003 | Ogawa et al. | 358/3.03 |
| 2004/0070590 A1* | 4/2004 | Lee et al. | 345/690 |
| 2004/0239694 A1* | 12/2004 | Takeda et al. | 345/690 |
| 2005/0237277 A1* | 10/2005 | Kawahara | 345/63 |
| 2006/0262038 A1 | 11/2006 | Lee | |
| 2006/0279482 A1* | 12/2006 | Otobe et al. | 345/63 |
| 2007/0063927 A1* | 3/2007 | Choi | 345/63 |

FOREIGN PATENT DOCUMENTS

| | | |
|---|---|---|
| JP | 2000-152005 | 5/2000 |
| JP | 2000-276100 | 10/2000 |
| JP | 2001-211323 | 8/2001 |
| JP | 2002-135582 | 5/2002 |
| JP | 2003-283829 | 10/2003 |

* cited by examiner

FIG. 1

| Gradations of input image signal (256 gradations) | Available gradations (11 gradations) |
|---|---|
| 0 | 0 |
| 1-2 | 1 |
| 3-5 | 3 |
| 6-11 | 6 |
| 12-22 | 12 |
| 23-40 | 23 |
| 41-70 | 41 |
| 71-114 | 71 |
| 115-174 | 115 |
| 175-254 | 175 |
| 255 | 255 |

FIG. 3

| Gradations of input image signal | Gradation candidates A | Gradation candidates B | Gradation candidates C |
|---|---|---|---|
| 0 | 0 | 1 | 3 |
| 1-2 | 1 | 3 | 6 |
| 3-5 | 3 | 6 | 12 |
| 6-11 | 6 | 12 | 23 |
| 12-22 | 12 | 23 | 41 |
| 23-40 | 23 | 41 | 71 |
| 41-70 | 41 | 71 | 115 |
| 71-114 | 71 | 115 | 175 |
| 115-174 | 115 | 175 | 255 |
| 175-254 | 175 | 255 | 255 |
| 255 | 255 | 255 | 255 |

FIG. 7

| Gradations of input image signal | Gradation candidates A 8bit | Gradation candidates B – Gradation candidates A 7bit | Gradation candidates C – Gradation candidates B 7bit |
|---|---|---|---|
| 0 | 0 | 1 | 2 |
| 1-2 | 1 | 2 | 3 |
| 3-5 | 3 | 3 | 6 |
| 6-11 | 6 | 6 | 11 |
| 12-22 | 12 | 11 | 18 |
| 23-40 | 23 | 18 | 30 |
| 41-70 | 41 | 30 | 44 |
| 71-114 | 71 | 44 | 60 |
| 115-174 | 115 | 60 | 80 |
| 175-254 | 175 | 80 | 0 |
| 255 | 255 | 0 | 0 |

IMAGE SIGNAL PROCESSING DEVICE AND IMAGE SIGNAL PROCESSING METHOD

TECHNICAL FIELD

The present invention relates to an image signal processing device and image signal processing method for eliminating image quality reduction due to shortage of gradation, in a display device for displaying a digital input image signal with multiple gradations.

BACKGROUND ART

When a display device where the number of displayable gradations is small performs multiple gradation display, smooth variation of brightness cannot be displayed. The brightness varies in steps, a contour-like pattern appears, and the image quality is reduced.

For example, a display device such as a plasma display panel (PDP) or a digital mirror device (DMD) displays multiple gradations by dividing one field to a plurality of subfields having different luminance weights and combining light emission and non-emission in each subfield. It is known that specific noise, known as a motion picture pseudo-outline, occurs in a motion picture part in this display device. For preventing the occurrence, the image display may be performed using not the gradations where the motion picture pseudo-outline is apt to occur but the gradations (hereinafter referred to as "available gradations") where the motion picture pseudo-outline hardly occurs. Here, an error diffusing method can be used for artificially displaying all gradations using available gradations. For example, Japanese Patent Unexamined Publication No. 2000-276100 discloses a method having a gradation converting means for converting a gradation to be displayed to an available gradation. In this method, when the gradation to be displayed is not available, this gradation is converted to an available gradation closest to itself, and the error occurring at this time is diffused to surrounding pixels and summed up. Thus, the gradation to be displayed is artificially displayed using only the available gradation.

It is advantageous from the aspect of the cost and mounting that a memory element such as a static random access memory (SRAM) is used as a gradation converting means. However, the access time of the SRAM is relatively slow, and an error cannot be diffused to the immediate right pixel when the access time exceeds one-data period. The SRAM cannot therefore be employed as the gradation converting means. Here, the one-data period is about 41 ns when one frame is 852×480 pixels, for example.

For addressing this problem, Japanese Patent Unexamined Publication No. 2000-276100 also discloses a method of using a lower bit of an image signal as a temporary error and diffusing the error to the immediate right pixel.

However, the error diffused to the immediate right pixel is not an accurate value in this method, so that the image quality is disadvantageously reduced compared with a case of correct error diffusion processing.

The present invention addresses the problems discussed above. The present invention provides an image signal processing device and an image signal processing method that can perform error diffusion processing to accurately diffuse an error to the immediate right pixel even when the access time of a means for converting the gradation exceeds one-data period.

SUMMARY OF THE INVENTION

The present invention provides an image signal processing device that artificially displays M gradations by converting an input image signal of M gradations to an output image signal of N (N<M) gradations and by diffusing an error generated by the conversion to pixels around a corresponding pixel. The image signal processing device has the following elements:

a first adding means for diffusing, to the input image signal, an error of which calculation is in time for the timing of diffusion to the input image signal of a certain pixel, of errors to be diffused to the certain pixel;

a gradation candidate converting means for converting a gradation of the image signal of which error is diffused by the first adding means to a plurality of gradation candidates as gradation candidates of the output image signal;

a delaying means for delaying the image signal of which error is diffused by the first adding means;

a second adding means for diffusing, to the image signal delayed by the delaying means, the error of which calculation is not in time for the timing of diffusion to the input image signal of a certain pixel, of the errors to be diffused to the certain pixel;

a gradation selecting means for selecting one gradation as the output image signal from a plurality of gradation candidates that are converted by the gradation candidate converting means, based on the gradations of the image signal of which error is diffused by the second adding means; and an error calculating means for calculating, as an error generated by the conversion, the difference between the gradation of the image signal of which error is diffused by the second adding means and the gradation selected as the output image signal by the gradation selecting means.

BRIEF DESCRIPTION OF THE DRAWINGS

FIG. 1 is a diagram showing correspondence between available gradations and gradations of an input image signal in an image signal processing device in accordance with an exemplary embodiment of the present invention.

FIG. 3 is a diagram showing correspondence between available gradations and gradations of the input image signal in the exemplary embodiment of the present invention.

FIG. 7 is a diagram showing correspondence between available gradations and gradations in another exemplary embodiment of the present invention.

DETAILED DESCRIPTION OF PREFERRED EMBODIMENTS

An image signal processing device in accordance with an exemplary embodiment of the present invention will be described hereinafter with reference to the following drawings. FIG. 1 is a diagram showing correspondence between available gradations and gradations of an input image signal in the exemplary embodiment of the present invention. In the present embodiment, the available gradations are 0, 1, 3, 6, 12, 23, 41, 71, 115, 175, and 255, and the 256 gradations of 0 to 255 are displayed using these 11 gradations. It is assumed that one frame is formed of 852×480 pixels and one-data period is about 41 ns. The present invention is not limited to these values.

Figure 2A:
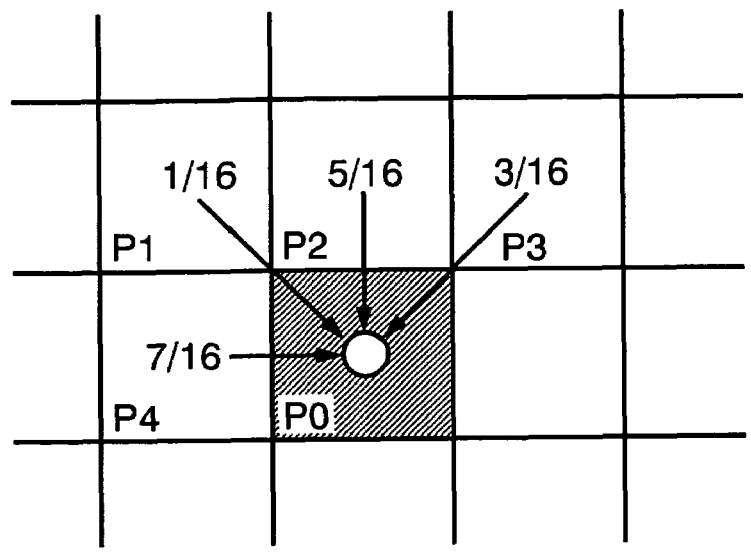
FIGS. 2A and 2B are diagrams showing a basic concept of error diffusion processing.
Figure 2B:
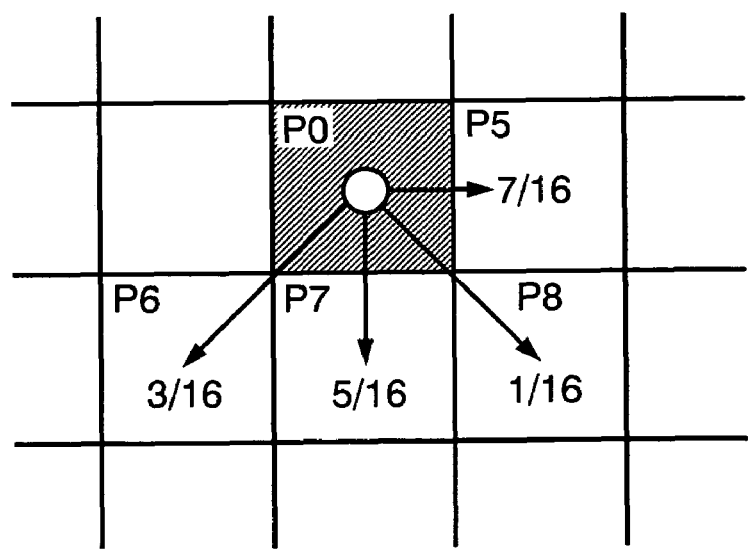

A concept of an image signal processing method of the present invention is first described. FIGS. 2A and 2B are diagrams showing a basic concept of the error diffusion processing. As shown in FIG. 2A, attention is focused on one pixel P0, and a corresponding image signal is assumed to be input. Display errors of pixels P1, P2 and P3, which are one line before target pixel P0, and pixel P4, which is just before target pixel P0, are multiplied by weighting factors k1, k2, k3 and k4, respectively, and the sum of the products is added to the input image signal of target pixel P0. The resultant image signal is compared with values in a gradation converting means, and a value closest to the resultant image signal is output as an output image signal of pixel P0. Simultaneously, as shown in FIG. 2B, the difference between the resultant image signal and the output image signal is determined as a display error, and the display error is multiplied by weighting factors k5 (=k4), k6 (=k3), k7 (=k2) and k8 (=k1), and the products are respectively diffused to pixel P5, which is just after target pixel P0 and pixels P6, P7 and P8, which are after target pixel P0 by one line. These weighting factors are set so as to satisfy k1+k2+k3+k4=1, and it is assumed that k1=k8=1/16, k2=k7=5/16, k3=k6=3/16, and k4=k5=7/16 in FIG. 2.

About one-line period is allowed until respective display errors of pixels P1, P2 and P3, which are before target pixel P0 by one line, are determined, multiplied by the weighting factors, and added to target pixel P0. The one-line period is 41 ns×852 pixels=about 3.5 μs, and the access can be performed in good time even when an SRAM is employed as the gradation converting means. Until the display error of pixel P4, which is just before target pixel P0 is determined, multiplied by the weighting factor, and added to target pixel P0, only one-data period is allowed.

In the image signal processing method of the present embodiment, the display errors of pixels having sufficient lead time, namely pixels P1, P2 and P3, which are before target pixel P0 by one line, are multiplied by weighting factors k1, k2 and k3, respectively, and the sum of the products is added to the input image signal of target pixel P0. The gradation of the resultant image signal is converted to an available gradation. At this time, however, the display error of immediate left pixel P4 is not determined, so that the gradation of the resultant image signal is converted to a plurality of available gradation candidates that are convertible when the error of pixel P4 is added. Then, the error generated in immediate left pixel P4 is multiplied by weighting factor k4, and the product is added to the image signal of target pixel P0 including the errors of pixels P1 to P3. A gradation closest to the gradation of the image signal is selected from the plurality of gradation candidates, and is output as the image signal of target pixel P0. The display error of the image signal is calculated and diffused to surrounding pixels P5 to P8.

FIG. 3 is a diagram showing correspondence between available gradations and gradations of the input image signal in the exemplary embodiment. The gradation of the input image signal is converted to three gradation candidates in the present embodiment. When the sum of the input image signal corresponding to target pixel P0 and the errors generated in three pixels P1 to P3, which are before target pixel P0 by one line is "20", three gradation candidates "12", "23" and "41" are output. When the error generated in immediate left pixel P4 is "16", for example, "16" is multiplied by "7/16", the product "7" is added to "20" to provide "27".

Finally, "23", which is closest to "27" is output as an output image signal of target pixel P0. The difference "4" between "27" and "23" is diffused as the error to surrounding pixels P5 to P8.

Even when a memory element such as an SRAM of which access time exceeds the one-data period is employed as the gradation candidate converting means, the error diffusion processing of accurately diffusing the error to the immediate right pixel can be performed.

Figure 4:
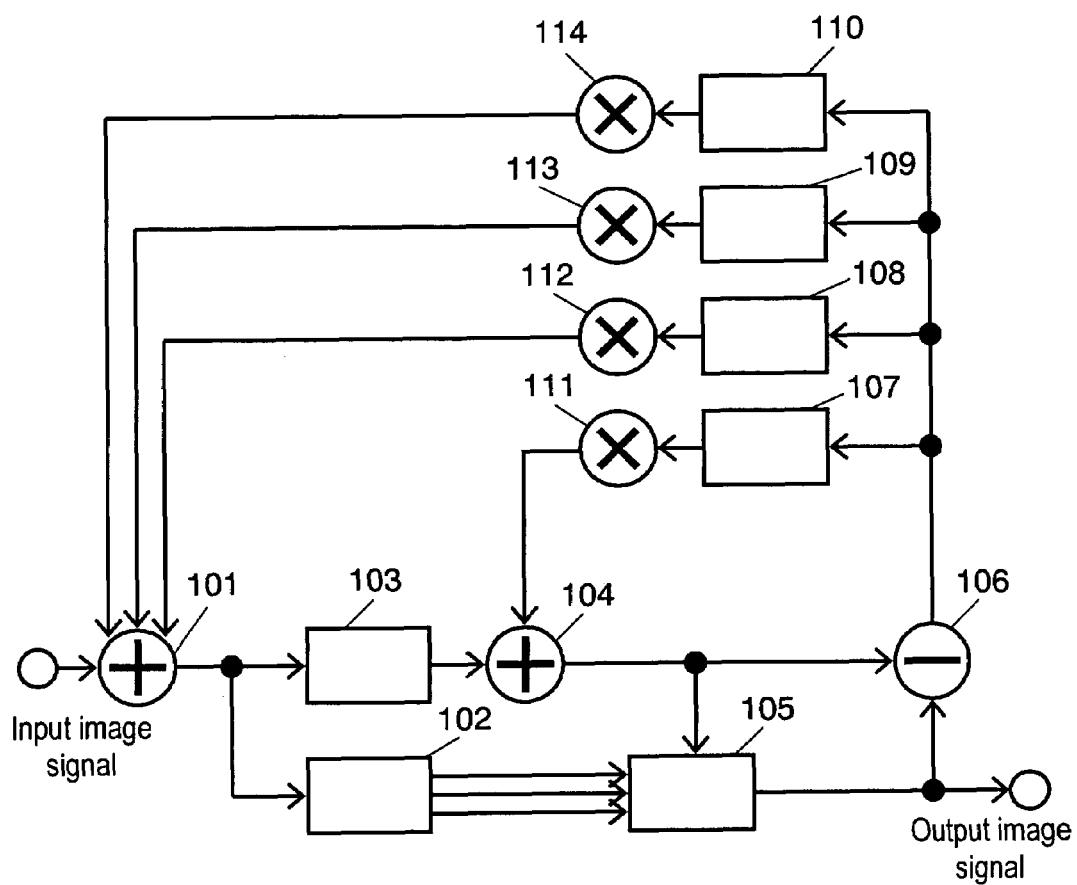
FIG. 4 is a circuit block diagram showing a configuration of the image signal processing device in accordance with the exemplary embodiment.

FIG. 4 is a circuit block diagram showing a configuration of the image signal processing device in accordance with the exemplary embodiment. Delaying circuit 110 delays the image signal by the time that is derived by subtracting the access time of the SRAM from the one-line period and the one-data period, and multiplying circuit 114 multiplies the output of delaying circuit 110 by weighting factor k1. Delaying circuit 109 delays the image signal by the time that is derived by subtracting the access time of the SRAM from the one-line period, and multiplying circuit 113 multiplies the output of delaying circuit 109 by weighting factor k2. Delaying circuit 108 delays the image signal by the time that is derived by subtracting the one-data period and the access time of the SRAM from the one-line period, and multiplying circuit 112 multiplies the output of delaying circuit 108 by weighting factor k3. Delaying circuit 107 delays the image signal by the one-data period, and multiplying circuit 111 multiplies the output of delaying circuit 107 by weighting factor k4.

First adding circuit 101 as the first adding means sums the input image signal, the output of multiplying circuit 114, the output of multiplying circuit 113, and the output of multiplying circuit 112. When the input image signal is assumed to be an image signal corresponding to target pixel P0, the outputs of multiplying circuits 114, 113 and 112 are error signals from pixels P1, P2 and P3, respectively.

Gradation candidate converting means 102 supplies three gradation candidates shown in FIG. 3 with respect to the output of first adding circuit 101. Here, the gradation candidates are converted to provide a first gradation that is not larger than the gradation of the output of first adding circuit 101 and closest to the gradation of the output of first adding circuit 101, a second gradation next larger than the first gradation, and a third gradation next larger than the second gradation. Thanks to the conversion, the display error does not become negative, and the circuit configuration of first adding circuit 101 or second adding circuit 104 can be simplified.

Gradation candidate converting means 102 is formed of a memory element of slow access time, or is formed of an SRAM where access time is five times longer than the one-data period in the present embodiment. Delaying circuit 103 as a delaying means delays the output of first adding circuit 101 by the access time of gradation candidate converting means 102. The delaying time of delaying circuit 103 is equal to a 5-data period in the present embodiment.

Second adding circuit 104 as the second adding means sums the image signal delayed by delaying circuit 103 and an output of multiplying circuit 111. The output of multiplying circuit 111 corresponds to the error of pixel P4, so that the errors of four adjacent pixels P1, P2, P3 and P4 are diffused to the output of second adding circuit 104.

Gradation selecting means 105 selects a gradation closest to the output of second adding circuit 104 from three gradation candidates supplied from gradation candidate converting means 102, and outputs it as the output image signal. Differencing circuit 106 as an error calculating means determines a display error, namely a difference between the gradation of the image signal of which error is diffused by second adding circuit 104 and the gradation selected as the output image signal by gradation selecting means 105, and outputs the difference as a display error of pixel P0 to delaying circuits 110, 109, 108 and 107.

Figure 5:
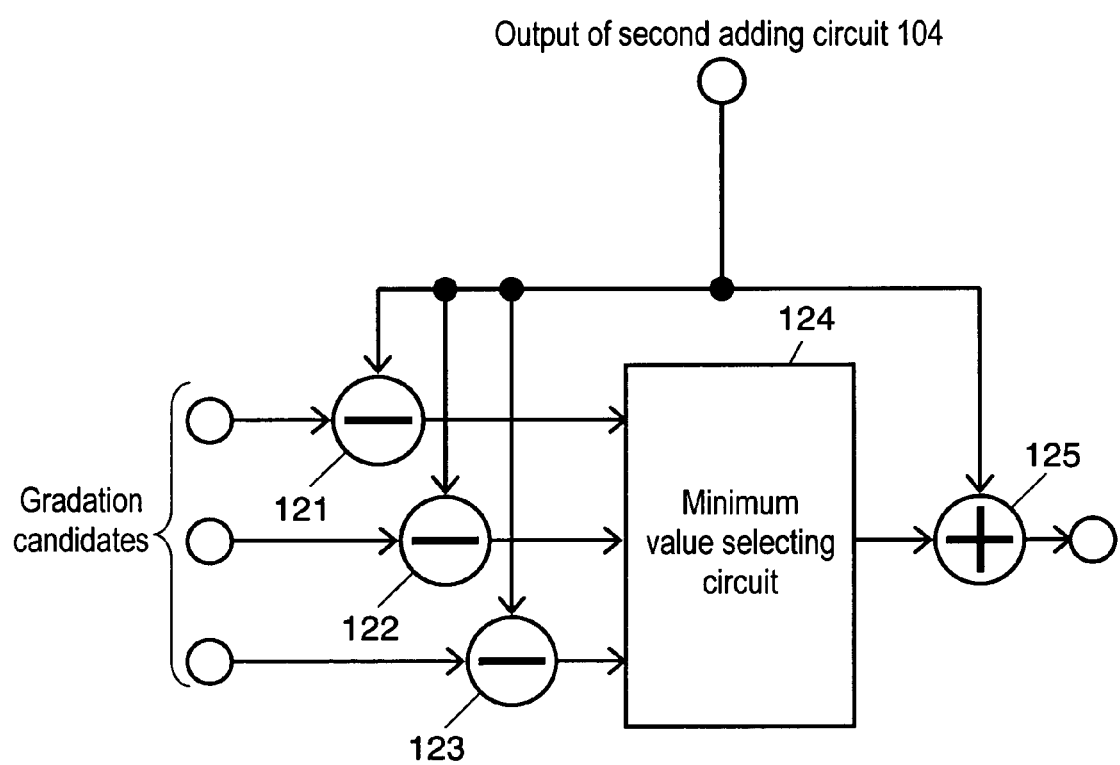
FIG. 5 is a circuit block diagram of a gradation selecting means of the exemplary embodiment.

FIG. 5 is a circuit block diagram of gradation selecting means 105 of the exemplary embodiment of the present invention. Each of differencing circuits 121, 122 and 123 determines a difference between the output of second adding circuit 104 and each of the three gradation candidates. Minimum value selecting circuit 124 selects the minimum value of the absolute values of the outputs of differencing circuits 121, 122 and 123. Adding circuit 125 adds the output of second adding circuit 104 to the output of minimum value selecting circuit 124, and outputs the gradation closest to the output of second adding circuit 104 of the three gradation candidates. Gradation selecting means 105 can be formed of a random logic, so that high speed processing is allowed.

Figure 6:
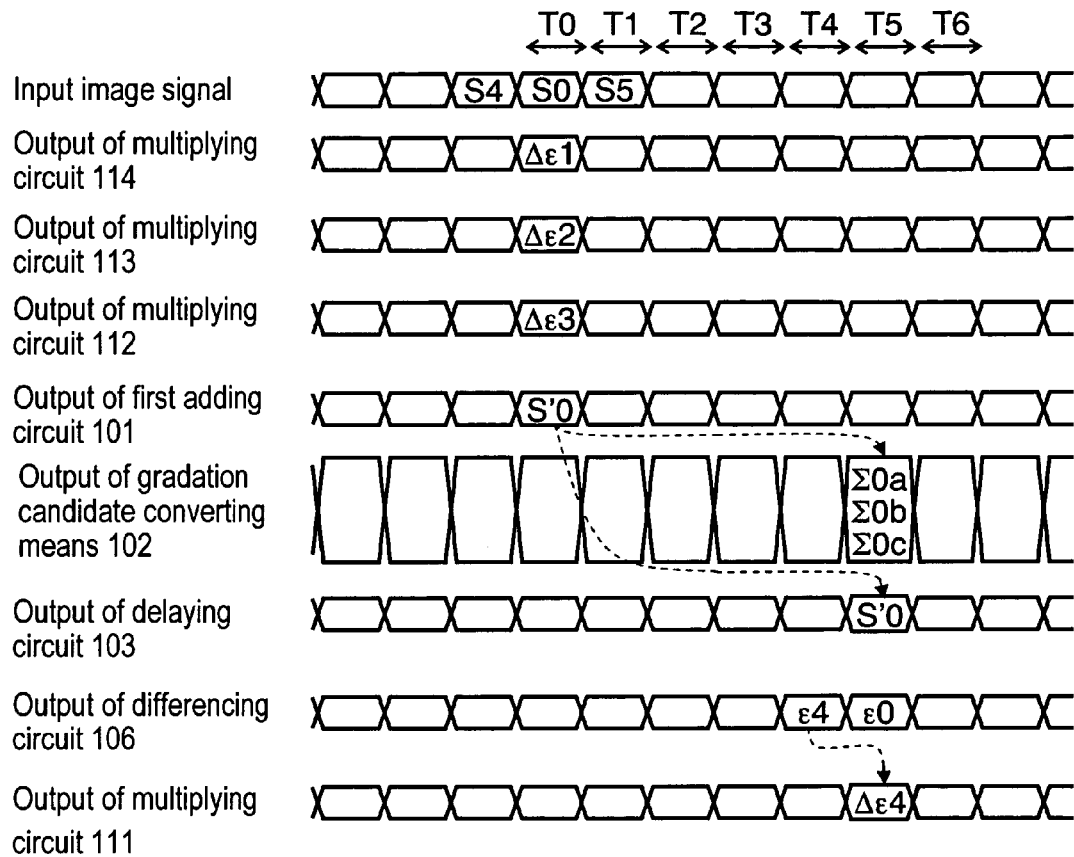
FIG. 6 is a timing chart showing an operation of the image signal processing device in accordance with the exemplary embodiment.

FIG. 6 is a timing chart showing an operation of the image signal processing device in accordance with the exemplary embodiment. For the sake of simplicity, it is assumed that the processing times of first adding circuit 101, second adding circuit 104, multiplying circuits 111 to 114, differencing circuit 106, and gradation selecting means 105 are sufficiently shorter than the one-data period and can be neglected. The access time of gradation candidate converting means 102 is assumed to be a 5-data period.

The data period over which input image signal S0 corresponding to target pixel P0 is input is set to be T0. As discussed above, about one-line period is allowed until errors diffused from pixels P1, P2 and P3, which are before pixel P0 by one line are determined, so that delay amounts of delaying circuits 110, 109 and 108 can be adjusted to make the output times of errors $\Delta\epsilon1$, $\Delta\epsilon2$ and $\Delta\epsilon3$ diffused to pixel P0 from multiplying circuits 114, 113 and 112 coincide with period T0. Signal S'0 to which errors $\Delta\epsilon1$, $\Delta\epsilon2$ and $\Delta\epsilon3$ are added at period T1 is supplied from first adding circuit 101.

Since the access time of gradation candidate converting means 102 is a 5-data period, three gradation candidates $\Sigma0a$, $\Sigma0b$ and $\Sigma0c$ are output at period T5. At this time, delaying circuit 103 delays signal S'0 to period T5. When error $\Delta\epsilon4$ diffused from immediate left pixel P4 exists at period T5, output signal $\Sigma0$ and display error $\epsilon0$ corresponding to target pixel P0 can be determined. The image signal of immediate left pixel P4 is input before target pixel P0 by one-clock period, so that display error $\epsilon4$ corresponding to pixel P4 is previously determined at period T4 before period T5 by one-clock period. Therefore, delaying circuit 107 delays the signal by one-data period and multiplying circuit 111 multiplies display error $\epsilon4$ by the weighting factor, thereby providing error $\Delta\epsilon4$ to be diffused from pixel P4 to pixel P0 at period T5.

In the present embodiment, even when the access time of gradation candidate converting means 102 exceeds the one-data period, accurate error diffusion processing can be performed. An SRAM disposed inside or outside a large scale integration (LSI) separated from a logic unit for executing the image signal processing can therefore be used as gradation candidate converting means 102.

In the present embodiment, as shown in FIG. 3, gradations themselves are stored as a plurality of gradation candidates in a storage cell such as an SRAM. However, instead of the gradation itself, the value of a gradation candidate and the difference between the gradation candidate and the next gradation candidate may be stored, and the gradation may be reproduced by an adding circuit or the like. FIG. 7 is a diagram showing correspondence between the available gradations and the gradations of an input image signal in another exemplary embodiment of the present invention. This storage of the difference allows reduction of the storage capacity of a storage element. When the value shown in FIG. 7 is actually compared with the value shown in FIG. 3, the storage capacity is reduced by 2 bits.

The case of having three gradation candidates has been described, but the number of gradation candidates can be set at an arbitrary number.

In the present embodiment, it is assumed that the processing times of first adding circuit 101, second adding circuit 104, multiplying circuits 111 to 114, differencing circuit 106, and gradation selecting means 105 can be neglected. However, when the processing times of these circuits are long to a certain extent, the above-mentioned effect can be obtained by adjusting the delay times of delaying circuits 103, 107, 108, 109 and 110.

In the image signal processing device and the image signal processing method of the present invention, the error diffusion processing of correctly diffusing an error to the immediate right pixel can be executed even when the access time of a gradation converting means exceeds the one-data period.

INDUSTRIAL APPLICABILITY

In the image signal processing device and the image signal processing method of the present invention, the error diffusion processing of correctly diffusing an error to the immediate right pixel can be executed even when the access time of a gradation converting means exceeds the one-data period. Therefore, the device and method are useful as an image signal processing device and image signal processing method for eliminating image quality reduction due to shortage of gradation, in a display device for displaying a digital input image signal with multiple gradations.

The invention claimed is:

1. An image signal processing device for artificially displaying M gradations by converting an input image signal of M gradations to an output image signal of N (N<M) gradations and by diffusing an error generated by the conversion to a pixel around a corresponding pixel, the image signal processing device comprising:

first adding means for diffusing, to the input image signal, an error of which calculation is in time for the timing of diffusion to the input image signal of a certain pixel, of errors to be diffused to the certain pixel;

gradation candidate converting means for converting a gradation of the image signal of which error is diffused by the first adding means to a plurality of gradation candidates as gradation candidates of the output image signal;

delaying means for delaying the image signal of which error is diffused by the first adding means;

second adding means for diffusing, to the image signal delayed by the delaying means, an error of which calculation is not in time for the timing of diffusion to the input image signal of a certain pixel, of errors to be diffused to the certain pixel;

gradation selecting means for selecting one gradation as the output image signal from the plurality of gradation candidates that are converted by the gradation candidate converting means, based on a gradation of the image signal of which error is diffused by the second adding means; and error calculating means for calculating, as an error generated by the conversion, a difference between the gradation of the image signal of which error is diffused by the second adding means and the gradation selected as the output image signal by the gradation selecting means.

2. The image signal processing device according to claim 1,
wherein the plurality of gradation candidates are, of the N gradations, a first gradation that is not larger than a gradation of an output of the first adding means and closest to the gradation of the output of the first adding means, a second gradation next larger than the first gradation, and a third gradation next larger than the second gradation.

3. An image signal processing method of artificially displaying M gradations by converting an input image signal of M gradations to an output image signal of N (N<M) gradations and by diffusing an error generated by the conversion to a pixel around a corresponding pixel, the image signal processing method comprising:
step 1 of diffusing, to the input image signal, an error of which calculation is in time for the timing of diffusion to the input image signal of a certain pixel, of errors to be diffused to the certain pixel;
step 2 of converting a gradation of the image signal of which error is diffused in step 1 to a plurality of gradation candidates as gradation candidates of the output image signal;
step 3 of delaying the image signal of which error is diffused in step 1;
step 4 of diffusing, to the image signal delayed in step 3, an error of which calculation is not in time for the timing of diffusion to the input image signal of a certain pixel, of errors to be diffused to the certain pixel;
step 5 of selecting one gradation as the output image signal from the plurality of gradation candidates converted in step 2, based on a gradation of the image signal of which error is diffused in step 4; and
step 6 of calculating, as an error generated by the conversion, a difference between the gradation of the image signal of which error is diffused in step 4 and the gradation selected as the output image signal in step 1.

4. The image signal processing method according to claim 3,
wherein the plurality of gradation candidates are, of the N gradations, a first gradation that is not larger than a gradation of an output in step 1 and closest to the gradation of the output in step 1, a second gradation next larger than the first gradation, and a third gradation next larger than the second gradation.

* * * * *

UNITED STATES PATENT AND TRADEMARK OFFICE
CERTIFICATE OF CORRECTION

PATENT NO. : 7,310,105 B2 Page 1 of 1
APPLICATION NO. : 10/542025
DATED : December 18, 2007
INVENTOR(S) : Kazuhiro Yamada It is certified that error appears in the above-identified patent and that said Letters Patent is hereby corrected as shown below:

IN THE CLAIMS

In claim 3, at column 8, line 17, "step 1." should be --step 5.--.

Signed and Sealed this

Second Day of September, 2008

JON W. DUDAS
*Director of the United States Patent and Trademark Office*